(12) United States Patent
Spaulding et al.

(10) Patent No.: US 7,064,869 B2
(45) Date of Patent: Jun. 20, 2006

(54) METHOD FOR HALFTONING A MULTI-CHANNEL DIGITAL COLOR IMAGE HAVING AT LEAST ONE GROUP OF SIMILAR COLOR CHANNELS

(75) Inventors: Kevin E. Spaulding, Spencerport, NY (US); Douglas W. Couwenhoven, Fairport, NY (US); Qing Yu, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 917 days.

(21) Appl. No.: 09/887,420

(22) Filed: Jun. 22, 2001

(65) Prior Publication Data

US 2003/0081228 A1    May 1, 2003

(51) Int. Cl.
*H04N 1/40* (2006.01)
(52) U.S. Cl. .................................. 358/3.1; 358/3.09
(58) Field of Classification Search ................ 358/1.9, 358/2.1, 3.09–3.12, 534–536, 500, 502, 3.06, 358/3.2
See application file for complete search history.

(56) References Cited

U.S. PATENT DOCUMENTS

| | | | |
|---|---|---|---|
| 4,920,501 A | 4/1990 | Sullivan et al. |
| 5,111,310 A | 5/1992 | Parker et al. |
| 5,214,517 A | 5/1993 | Sullivan et al. |
| 5,317,418 A | 5/1994 | Lin |
| 5,341,228 A | 8/1994 | Parker et al. |
| 5,469,515 A | 11/1995 | Lin |

(Continued)

FOREIGN PATENT DOCUMENTS

EP    0 835 025 A2    4/1998

(Continued)

OTHER PUBLICATIONS

XP-000901274, Color Halftoning with Blue Noise Masks, Qing Yu, Kevin J. Parker, and Meng Yao, The Fourth IS&T/SID Color Imaging Conference: Color Science, Systems and Applications, pp. 77-79.

*Primary Examiner*—Thomas D. Lee
*Assistant Examiner*—Stephen Brinich
(74) *Attorney, Agent, or Firm*—Thomas H. Close

(57) ABSTRACT

A method for halftoning a multi-channel digital color image having an x,y array of color pixel values, wherein at least two color channels are similar having substantially the same color but with low- and high-densities, includes the steps of: providing a matrix of dither values for each group of similar color channels wherein two or more of the matrices of dither values are designed jointly to minimize a visual cos t function; for at least one group of similar color channels, forming an inverted matrix of dither values by subtracting the value of each element of the matrix of dither values for that group from a predetermined maximum value, associating the inverted matrix of dither values with one of the low- or high-density color channels, and associating the matrix of dither values for that group with the other low- or high-density color channel of that group; for each color channel of the multi-channel digital color image modularly addressing the matrix of dither values associated with that color channel using the location of a pixel in the digital color image to obtain ad addressed dither value; using the addressed dither value for each color channel, together with the pixel value for the corresponding color channel, to determine an output halftone image value for each color channel.

26 Claims, 7 Drawing Sheets

U.S. PATENT DOCUMENTS

| | | |
|---|---|---|
| 5,586,203 A | 12/1996 | Spaulding et al. |
| 5,729,259 A | 3/1998 | Gotoh et al. |
| 5,754,311 A | 5/1998 | Ray |
| 5,822,451 A | 10/1998 | Spaulding et al. |
| 6,020,978 A | 2/2000 | Cooper et al. |
| 6,268,931 B1 * | 7/2001 | Yamada et al. .............. 358/1.9 |

FOREIGN PATENT DOCUMENTS

| | | |
|---|---|---|
| EP | 0 899 937 A2 | 3/1999 |
| EP | 0 951 176 A2 | 10/1999 |
| JP | 01228862 A * | 9/1989 |

* cited by examiner

METHOD FOR HALFTONING A MULTI-CHANNEL DIGITAL COLOR IMAGE HAVING AT LEAST ONE GROUP OF SIMILAR COLOR CHANNELS

FIELD OF THE INVENTION

This invention relates generally to the field if digital image processing, and more particularly to a method for halftoning digital color images for a color output device having at least one group of similar color channels with substantially the same color but with low- and high-densities.

BACKGROUND OF THE INVENTION

Halftoning is a technique that is commonly used in digital imaging to create the appearance of intermediate tones when only two colorant levels (i.e., ink or no ink) are available. Halftoning methods rely on the fact that an observer's eye will spatially average over some local area of the image so that intermediate tone levels can be created by turning some of the pixels "on" and some of the pixels "off" in some small region. The fraction of the pixels which are turned on will determine the apparent gray level. Examples of common halftoning techniques include ordered dither and error-diffusion.

The ordered dither technique is typically implemented by forming a dither matrix having $M_x \times M_y$ elements which is tiled across the image. The elements of the dither matrix are distributed across the range of expected input tone values so that the full range of tones can be reproduced. A basic flow chart for this approach is shown in FIG. 1. A given pixel in the image has column and row addresses x and y, respectively, and an input pixel value I(x,y). Modulo operators 10 are used to determine indices $x_d$ and $y_d$ that are used to address the dither matrix 12. The threshold value $d(x_d,y_d)$ stored in the dither matrix at this address is then compared to the input pixel value I(x,y) using a comparator 14. If the input pixel value is equal to or below the threshold value, the output pixel value O(x,y) is set to "off"; if the value is above the threshold, the output pixel value O(x,y) is set to "on".

A second implementation of this basic technique is shown in FIG. 2. In this case the threshold value $d(x_d,y_d)$ is combined with the input pixel value I(x,y) using an adder 24. A threshold operator 26 is then used to threshold the combined value to determine the output pixel value O(x,y).

Another implementation of this basic technique is shown in FIG. 3. In this case a set of k dither bitmaps 32 are formed corresponding to the halftone patterns formed when the dither matrix is thresholded at each input level k. The input pixel value I(x,y) is then used to select which of the dither bitmaps should be used for each pixel. Modulo operators 30 are used to determine indices $x_d$ and $y_d$ that are used to address the selected dither bitmap to determine the output pixel value O(x,y). This implementation has the advantage that fewer computations are necessary to process each pixel. It should be noted that any dither pattern which can be implemented using the methods of FIG. 1 and FIG. 2 can also be implemented using the method of FIG. 3. However, it is possible to define a set of dither bitmaps for the method of FIG. 3 that could not be implemented using the other methods. This is because in the dither matrix implementations once a certain pixel is turned on at the input value corresponding to the threshold, it will stay on for all higher input values. With the dither bitmaps approach this constraint is not present. For example, a certain pixel could be "off" for an input value of 150, "on" for an input value of 151, and "off" again for an input value of 152.

Yet another implementation of this basic technique is shown in FIG. 4. In this case a set of dither look-up tables (LUTs) 36. The dither LUTs 36 are addressed by the input pixel value I(x,y) and store the corresponding output pixel value to be produced at some pixel location. Modulo operators 30 are used to determine indices $x_d$ and $y_d$ that are used to address a dither LUT selector 34 which selects one of the dither LUTs 36. The output pixel value O(x,y) is determined by addressing the selected dither LUT with the input pixel value I(x,y). This implementation also has the advantage that fewer computations are necessary to process each pixel. It should be noted that any dither pattern which can be implemented using the methods of FIG. 1 and FIG. 2 can also be implemented using the method of FIG. 4. However, as with the method shown in FIG. 3, it is also possible to define a set of dither LUTs 36 that could not be implemented using the other methods.

A variety of different dither matrices have been used in the past which create resulting images with different visual characteristics. Common types include random dither matrices, clustered-dot dither matrices, and Bayer (dispersed dot) dither matrices. U.S. Pat. No. 4,920,501, issued Apr. 24, 1990 to Sullivan et al. discloses a technique to design dither bitmaps which have minimum visual modulation. These patterns are sometimes called "blue-noise" patterns. They are attractive in that the patterns that are produced have minimum visibility to human observers, and as a result the images produced are visually pleasing relative to images produced using other patterns. The basic procedure involved in the creation of these patterns is to use an optimization technique, such as stochastic annealing, to determine the arrangement of the matrix elements which minimizes some cos t function based upon weighting the frequency components of the halftone patterns with a human visual sensitivity function. Sullivan and Ray have also disclosed an enhancement to this method which insures that the bitmaps for each of the gray levels are correlated in such a way that they can be implemented using a dither matrix (see U.S. Pat. No. 5,214,517 issued May 25, 1993 to Sullivan et al.). Other extensions to this basic approach include a method for simultaneously optimizing all of the gray levels (see U.S. Pat. No. 5,754,311 issued May 19, 1998 to Ray), and a method for designing blue-noise dither matrices for use with multi-level output devices (see U.S. Pat. No. 5,586,203, issued Dec. 17, 1996 to Spaulding et al.).

Parker et al. (see U.S. Pat. No. 5,111,310 issued May 5, 1992) and Lin (see U.S. Pat. No. 5,317,418 issued May 31, 1994, and U.S. Pat. No. 5,469,515 issued Nov. 21, 1995) have also recently introduced techniques for the design of dither patterns. Although the actual optimization methods that they have used are somewhat different, the resulting patterns are quite similar to those created using the methods described in the Sullivan et al. patents.

When producing color images on binary output devices, it is necessary to halftone each of the color channels. Typically the color planes are cyan, magenta and yellow (CMY), or cyan, magenta, yellow and black (CMYK). If the same halftoning pattern is used for each of the color channels, this is known as "dot-on-dot" printing. This approach is rarely used in practice because it results in a higher level of luminance modulation, and additionally the color reproduction characteristics will be more sensitive to registration errors. The higher level of luminance modulation will cause the halftone patterns to be more visible than one of the color channels printed alone. The increased sensitivity to registration errors may cause the reproduced color to drift page to page, or even within a page, as the registration characteristics of printing apparatus change. In the graphic arts field the preferred solution has typically been to decorrelate the halftone patterns by rotating the halftone patterns to different "screen angles." For conventional graphic arts halftone methods, this rotation can either be accomplished optically or digitally.

A number of techniques have been suggested for decorrelating the halftone patterns used for ordered dither (for example see U.S. Pat. No. 5,341,228 issued Aug. 23, 1994 to Parker et al.). These include using independently derived dither matrices for each color channel, spatially shifting the dither matrix patterns for each color plane relative to a reference dither matrix, and using an inverse dither matrix for one or more of the color channels. Each of these techniques has the advantage that the halftone patterns for the different color channels will be decorrelated, and therefore the resulting halftone image should produce lower amounts of luminance modulation and sensitivity to registration errors relative to the nominal dot-on-dot printing case. However, none of these techniques will produce images that exhibit optimal appearance, particularly with respect to the visibility of the halftone patterns.

U.S. Pat. No. 5,822,451 issued Oct. 13, 1998 to Spaulding et al. discloses a method for halftoning a multi-channel digital color image wherein dither matrices for the different color channels of the color image are designed jointly to minimize a visual cos t function. One embodiment of this method is shown in FIG. 5. It can be seen that a conventional dither halftoning method like that shown in FIG. 1 is applied to each channel of a multi-channel color image, wherein the dither matrices used for each color channel are jointly optimized. In particular, a multi-channel input color image having a cyan input image 40A, a magenta input image 40B, and a yellow input image 40C is processed to form a multi-channel output color image having a corresponding cyan output image 48A, magenta output image 48B, and yellow output image 48C. Modulo operators 42A, 42B, and 42C are used to determine the dither matrix column and row addresses $x_d$ and $y_d$, respectively for an input pixel having image column and row addresses x and y, respectively. The dither matrix column and row addresses are used to address jointly optimized dither matrices 44A, 44B, and 44C which are jointly optimized for the cyan, magenta and yellow color channels to determine cyan, magenta, and yellow dither values $d_c(x_d,y_d)$, $d_m(x_d,y_d)$, and $d_y(x_d,y_d)$, respectively. The addressed dither values are then compared to the input pixel values, $I_c(x,y)$, $I_m(x,y)$, and $I_y(x,y)$ for the corresponding color channels using comparators 46A, 46B, and 46C to determine the output pixel values $O_c(x,y)$, $O_m(x,y)$, and $O_y(x,y)$. If the input pixel value is larger than the addressed dither value, the comparator will turn the output pixel value to "on." Conversely, if the input pixel value is equal to or smaller than the addressed dither value, the comparator will turn the output pixel value to "off." Any other variety of dither algorithms could also be used, such as the methods shown in FIG. 2, FIG. 3 or FIG. 4.

While the method of Spaulding et al. produces excellent results for conventional CMY(K) printers, some recently introduced printers include multiple colorants having different density levels for one or more of the printer's color channels. For example, these printers may use both a light cyan ink and a dark cyan ink. Likewise there may also be similar light/dark ink pairs for the black, magenta and/or yellow channels.

When light/dark ink pairs are used, there are many ways to determine the color values for each of the color channels. For example, the color values for the light/dark color channels may be determined by splitting a corresponding input color channel. For example, a cyan input color channel can be split into a light cyan color channel and a dark cyan color channel by using the cyan color value to address a look-up table for the light cyan color channel, and a second look-up table for the dark cyan color channel as taught by Couwenhoven et al in U.S. patent application Ser. No. 09/455,981, filed Dec. 6, 1999. Alternatively, the color values for the light/dark color channels can be determined using more complicated color modeling techniques. In that case, a multi-dimensional look-up table, or some other complex function may be necessary to compute the color values.

While the halftoning method of Spaulding et al. taught in U.S. Pat. No. 5,822,451 cited above, can, in general, be applied to determine dither matrices for a set of color channels, including the light and dark ink color channels, there are several limitations to this approach. First of all, the computational complexity of the optimization process increases substantially with every additional color channel, which can make determination of the dither matrices impractical in some cases. Secondly, the definition of the visual cos t function values can become quite ambiguous due to the complex relationship that may exist between the amounts of the individual colorants that are used in different parts of color space. Additionally, it is desirable, in many cases, to minimize the overlap of the light/dark ink pairs in order to minimize the amount of white paper that results when there is partial coverage in the light/dark color channels. The prior art makes no provision for meeting this criterion while maintaining the desirable characteristics of the jointly optimized dither patterns. For example, if a given color calls for 50% coverage of light cyan ink and 50% coverage of dark cyan ink, the method of Spaulding et al may produce dither patterns where some pixels have neither light ink or dark ink, and other pixels have both light ink and dark ink.

There is a need therefore for an improved method for halftoning a multi-channel digital color image having similar color channels that avoids the problems noted above.

SUMMARY OF THE INVENTION

The need is met according to the present invention by providing a method for halftoning a multi-channel digital color image having an x,y array of color pixel values, wherein at least two color channels are similar having substantially the same color but with low- and high-densities, that includes the steps of: providing a matrix of dither values for each group of similar color channels wherein two or more of the matrices of dither values are designed jointly to minimize a visual cos t function; for at least one group of similar color channels, forming an inverted matrix of dither values by subtracting the value of each element of the matrix of dither values for that group from a predetermined maximum value, associating the inverted matrix of dither values with one of the low- or high-density color channels, and associating the matrix of dither values for that group with the other low- or high-density color channel of that group; for each color channel of the multi-channel digital color image modularly addressing the matrix of dither values associated with that color channel using the location of a pixel in the digital color image to obtain ad addressed dither value; using the addressed dither value for each color channel, together with the pixel value for the corresponding color channel, to determine an output halftone image value for each color channel.

ADVANTAGES

The present invention has the advantage that a set of dither matrices that have been optimized for use with a conventional color printer can be simply modified for use in a printer where one or more of the color channels is printed using a dark/light colorant pair.

It has the additional advantage that it provides a computationally efficient means for producing optimized dither matrices for color printers where one or more of the color channels is printed using a dark/light colorant pair.

It has the further advantage of minimizing the amount of dot overlap for the dark and light colorant pairs, thereby minimizing the amount of white dots in areas where only one ink color (e.g., cyan) is printed. This results in reducing the visibility of the halftone patterns for these image regions.

DETAILED DESCRIPTION OF THE INVENTION

The present invention comprises a method to compute a set of dither matrices for a color imaging device including at least one pair of light/dark colorants so as to minimize the visibility of halftone patterns generated using the dither matrices. It will be assumed in the following example, that the color imaging device has light cyan, dark cyan, light magenta, dark magenta and yellow color channels, but it should be noted that this technique can easily be generalized to other types of imaging systems having light and dark colorant pairs as well.

Figure 1:
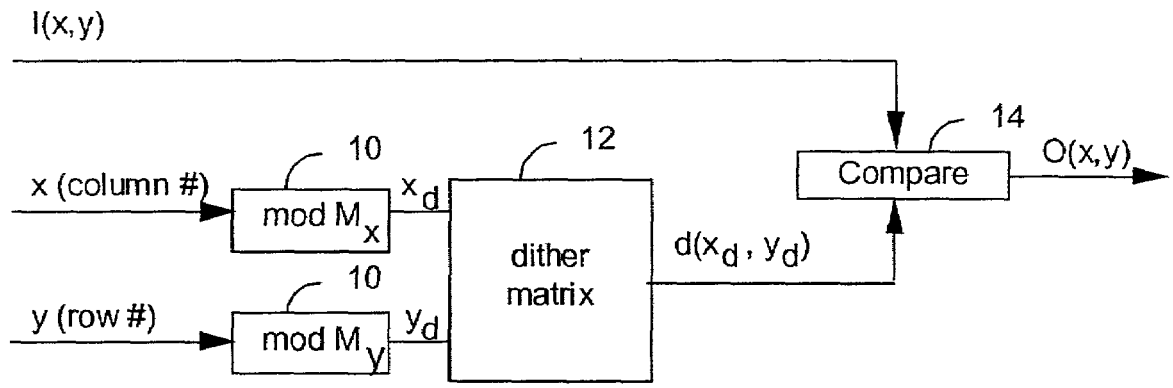
FIGS. 1–4 are schematic block diagrams showing prior art ordered dither techniques for halftoning.
Figure 2:
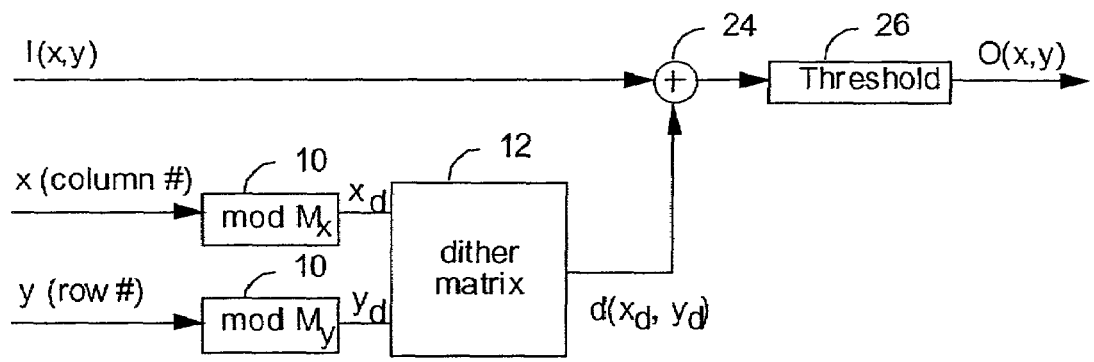
Figure 6:
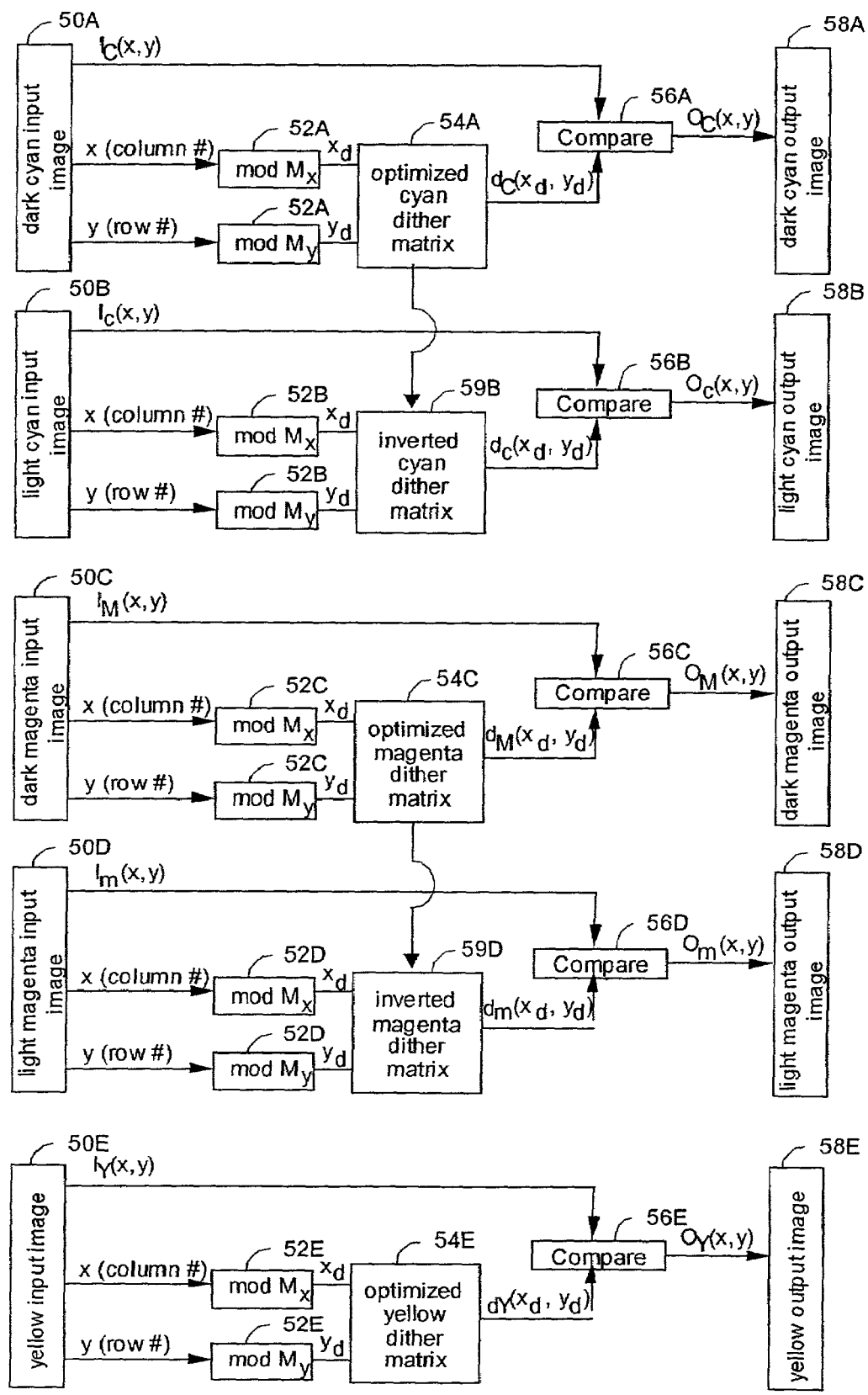
FIG. 6 is a schematic block diagram showing a method for halftoning an image according to the present invention.

With reference to FIG. 6, one embodiment of the present invention is shown. A multi-channel input color image has a dark cyan input image 50A, a light cyan input image 50B, a dark magenta input image 50C, a light magenta input image 50D, and a yellow input image 50E. The input images for each color channel are processed using a conventional dither halftoning method to form corresponding output images 58A, 58B, 58C, 58D and 58E. In this example, a dither halftoning technique like that shown in FIG. 1 is used to process the image for each color channel. But other dither halftoning methods, such as those shown in FIGS. 2–4, could also be used. In this dither halftoning method variation, modulo operators 52A, 52B, 52C, 52D and 52E are used to determine the dither matrix column and row addresses $x_d$ and $y_d$, respectively for an input pixel having image column and row addresses x and y, respectively. The dither matrix column and row addresses are used to address dither matrices 54A, 59B, 54C, 59D and 54E for the dark cyan, light cyan, dark magenta, light magenta and yellow color channels, respectively, to determine addressed dither values $d_C(x_d,y_d)$, $d_c(x_d,y_d)$, $d_M(x_d,y_d)$, $d_m(x_d,y_d)$, and $d_Y(x_d,y_d)$.

As will now be discussed, a key feature of the present invention is the method used to create the dither matrices which are applied to each color channel. In the example shown in FIG. 6, it can be seen that there are two groups of similar color channels where the colorants have substantially the same color, but with low- and high-densities. In particular, the light cyan and the dark cyan color channels form one group, and the light magenta and dark magenta form another group. The yellow color channel can be considered to be a group all by itself since it does not have a companion color channel.

A set of jointly optimized dither matrices 54A, 54C and 54E are designed jointly so as to minimize a visual cos t function, one matrix being provided for each group of similar color channels. These jointly optimized dither matrices can be determined, for example, using the method taught by Spaulding et al in U.S. Pat. No. 5,822,451 cited above, which is incorporated herein by reference. For the groups of color channels having low- and high-densities, it is also necessary to provide a second dither matrix. The jointly optimized dither matrix for a given group of color channels can be used for one of the low- or high-density color channels. (In the implementation shown in FIG. 6, the optimized dither matrices are used for the dark cyan and the dark magenta color channels.) The dither matrix for the remaining low- or high-density color channel in each group of color channels is then formed by inverting the jointly optimized dither matrix for that group of color channels. For example the optimized cyan dither matrix 54A is inverted to form an inverted cyan dither matrix 59B for use with the light cyan color channel. Likewise, the optimized magenta dither matrix 54C is inverted to form an inverted magenta dither matrix 59D for use with the light magenta color channel. More details about how the jointly optimized dither matrices and the inverted dither matrices can be determined will be discussed later.

Once the addressed dither values for each color channel, $d_C(x_d,y_d)$, $d_c(x_d,y_d)$, $d_M(x_d,y_d)$, $d_m(x_d,y_d)$, and $d_Y(x_d,y_d)$, have been determined, they are then compared to the input pixel values, $I_C(x,y)$, $I_c(x,y)$, $I_M(x,y)$, $I_m(x,y)$, and $I_Y(x,y)$ for the corresponding color channels using comparators 56A, 56B, 56C, 56D, and 56C, respectively, to determine output pixel values for each color channel $O_C(x,y)$, $O_c(x,y)$, $O_M(x,y)$, $O_m(x,y)$, and $O_Y(x,y)$. If the input pixel value is larger than the addressed dither value, the comparator will turn the output pixel value to "on." Conversely, if the input pixel value is less than or equal to the addressed dither value, the comparator will turn the output pixel value to "off."

The method shown in FIG. 6, with the optimized dither matrices of the present invention can be implemented as a computer program product that includes a computer storage medium such as a computer readable magnetic or optical storage medium or a solid state storage device such as a programmable memory device or a custom integrated circuit and employed with a digital computer to drive a color output device. The computer program product may be included in a digital color output device, included in a driver for such device, or sold as a separate software product. A pseudo code implementation of such a computer program is shown in Table 1.

TABLE 1

```
for y = 1 to number of rows in image
    for x = 1 to number of columns in image
    {
        x_d = x mod M_x
        y_d = y mod M_y
        DC = d_C(x_d, y_d)
        Dc = d_c(x_d, y_d)
        DM = d_M(x_d, y_d)
        Dm = d_m(x_d, y_d)
        DY = d_Y(x_d, y_d)
        if (I_C(x,y)<=DC)
            O_C(x,y) = 0
        else
            O_C(x,y) = 1
        if (I_c(x,y)<=Dc)
            O_c(x,y) = 0
        else
            O_c(x,y) = 1
        if (I_M(x,y)<=DM)
            O_M(x,y) = 0
        else
            O_M(x,y) = 1
        if (I_m(x,y)<=Dm)
            O_m(x,y) = 0
        else
            O_m(x,y) = 1
        if (I_Y(x,y)<=DY)
            O_Y(x,y) = 0
        else
            O_Y(x,y) = 1
    }
```

The jointly optimized dither matrices 54A, 54C, and 54E are designed so as to provide an output image having halftone patterns with minimum visibility to a human observer. In a preferred embodiment of the present invention, all of the groups of color channels are used to jointly compute the visibility of the halftone patterns. However, in some cases it may be desirable to use only a subset of the groups of color channels in the process of minimizing the visual cos t. For example, the halftone patterns for the cyan and magenta color channels could be jointly optimized, while the halftone patterns for the yellow color channel, which will have a smaller contribution to the overall pattern visibility, could be determined independently.

In a preferred embodiment of this invention the halftone pattern visibility is minimized by determining the dither matrices that minimize the visible luminance modulation. This is frequently appropriate since the human visual system is more sensitive to luminance modulation than it is to chrominance modulation. However, it should be noted that the methods disclosed herein can easily be extended to include terms in the cos t function which reflect the visibility of the chrominance modulation as well as the luminance modulation.

In order to design color halftone patterns that have minimum visibility to a human observer, it is first necessary to define a cos t function for computing the visibility for a given set of halftone patterns. For the case where only the luminance component of the halftone pattern visibility is considered, the first step is to compute a spatial luminance distribution from the set of color halftone patterns. One method that can be used to determine the spatial luminance distribution is by measuring the luminance values that result when each of the individual colorants (e.g., cyan, magenta, and yellow) are used, as well as the luminance values that result for the possible combinations of the colorants (e.g., red=magenta+yellow, green=cyan+yellow, blue=cyan+magenta, and black=cyan+magenta+yellow). The halftone patterns for each of the color channels are then superimposed and the luminance value corresponding to the resulting combination of colorants are assigned to each of the pixel locations to determine the resulting spatial luminance distribution.

The luminance values for the groups of color channels having low- and high-density colorants can be computed for one of the colorants, or some combination of the colorants. In a preferred embodiment of the present invention, the luminance of the highest density combination that will be produce for a group of color channels is used. For example, the highest density cyan that some printers will produce would be the density of the dark colorant. In other cases, the highest density cyan might correspond to an overprint of the low-density colorant with the high-density colorant.

Another approach that can be used to determine the spatial luminance distribution l(x,y) is to estimate it's value by computing a weighted sum of the individual halftone patterns $$l(x, y) = \sum_{i=1}^{N} w_i O_i(x, y) \tag{1}$$

where $O_i(x,y)$ is the output image bitmap for the $i^{th}$ color channel, N is the number of color channels and $w_i$ is a weighting factor for each channel. The weighting factors will generally reflect the relative contributions of each channel to the luminance signal. Typically, yellow would have the smallest contribution, and magenta would have the largest contribution. An example of typical weights would be $w_c=0.3$, $w_m=0.6$, $w_y=0.1$ for the cyan, magenta and yellow channels respectively.

Once the luminance distribution l(x,y) for a set of candidate halftone patterns has been computed, one method to compute the visibility of the luminance modulation is to Fourier transform the luminance distribution to compute a luminance spectrum $L(f_x,f_y)$. The luminance spectrum is then weighted by the human visual system sensitivity as a function of spatial frequency $V(f_x,f_y)$ to compute a weighted luminance spectrum. A cost value, which is an estimate of the visibility of the halftone pattern, is then computed by integrating a function of the weighted luminance spectrum over all frequencies. One particular form of the cost function that can be used is:

$$\cos t_{cmy} = \int\int |L_{CMY}(f_x,f_y) V(f_x, f_y)|^2 df_x df_y, \tag{2}$$

where $L_{CMY}(f_x,f_y)$ is the luminance spectrum corresponding to the halftone pattern for a particular color value, CMY, and $cost_{CMY}$ is the resulting cost value computed for this color value. Since the luminance distribution is typically specified for a discrete set of pixel values, it is frequently useful to work with a discrete form of this cos t function:

$$cost_{CMY} = \sum_{i=0}^{M_x-1} \sum_{j=0}^{M_y-1} |L_{CMY,ij} V_{ij}|^2 \tag{3}$$

where $L_{CMY,ij}$ is the (i,j)th element of the discrete Fourier transform of the luminance distribution for a particular CMY color value, and $V_{ij}$ is the human visual system sensitivity for the frequency corresponding to element (i,j).

One function that can be used to approximate the low-contrast photopic human visual system sensitivity is:

$$V(f_x, f_y) = \begin{cases} a(b+c\tilde{f})\exp(-(c\tilde{f})^d) & \tilde{f} > f_{max} \\ 1.0; & \text{otherwise;} \end{cases} \quad (4)$$

where the constants a, b, c, and d are calculated from empirical data to be 2.2, 0.192, 0.114, and 1.1 respectively, $\tilde{f}$ is the normalized radial spatial frequency in cycles/degree of visual subtense, and $f_{max}$ is the frequency at which the weighted exponential peaks. To account for variations in the human visual function sensitivity, the normalized radial spatial frequency is computed from the actual radial spatial frequency using an angular-dependent scale function:

$$\tilde{f} = \frac{f}{s(\theta)}, \quad (5)$$

$$f = \sqrt{f_x^2 + f_y^2}, \quad (6)$$

$$s(\theta) = \frac{1-w}{2}\cos(4\theta) + \frac{1+w}{2}, \quad (7)$$

where:

and s(θ) is given by:

with w being a symmetry parameter, and $$\theta = \arctan\left(\frac{f_y}{f_x}\right). \quad (8)$$

Other functional forms, such as a Gaussian approximation, can also be used to represent the human visual system sensitivity.

Often it is more convenient to compute the value of the cos t in the spatial domain rather than transforming the luminance distribution to the frequency domain. In this case, by applying the well-known Parseval's Theorem to Eq. (1), it can be seen that the cos t value can also be computed by $$\cos t_{CMY} = \iint |l_{CMY}(x,y) * v(x,y)|^2 dxdx, \quad (9)$$

where * indicates the convolution operation, $l_{CMY}(x,y)$ is the luminance distribution for a particular color value, CMY, and v(x,y) is the inverse Fourier transform of the human visual system sensitivity and can be interpreted as the human visual system point spread function. The discrete form of this cost function is:

$$cost_{CMY} = \sum_{i=0}^{M_x-1}\sum_{j=0}^{M_y-1}|(l_{CMY}*v)_{ij}|^2 \quad (10)$$

where $(l_{CMY}*v)_{ij}$ is the (i,j)th element of the perceived luminance distribution given by discrete convolution of the luminance distribution for a particular CMY color value with the human visual function system point spread function. It should be noted that since the luminance distribution generated by an ordered dither process will be periodic, the discrete convolution must take this fact into account by including contributions from surrounding dither arrays.

There are a number of ways that the visual cost associated with the halftone patterns can be minimized. In one embodiment, the bit patterns for all of the pixel values are optimized simultaneously. In this case a total cost value is computed which is a combination of the individual cost values for a set of CMY color values. A non-linear optimization technique can then be used to determine the bit patterns that will produce the minimum total cost value.

One form of the total cost that can be used is a weighted sum of the individual cost values $$cost_{total} = \sum_{CMY} w_{CMY} cost_{CMY}, \quad (11)$$

where $w_{CMY}$ is a weighting factor, and the summation is computed over a certain set of CMY color values. The choice of the particular subset of CMY color values, as well as the weights assigned to each color value will determine the relative importance of various parts of color space during the optimization process.

For example, if the neutral colors are believed to be the most important color values for a particular printing application the set of CMY color values having equal amounts of cyan, magenta, and yellow can be included in the summation. If all of the neutral colors are equally important, then the weighting factors can be defined to normalize the individual cost values so that they have similar magnitudes. Other color values that can be included in the set of CMY color values are primary color series where one color channel is varied throughout it's range, and the other color channels are set to zero. CMY color values for particularly important colors such as skin-tones, sky colors and grass colors can also be included. Yet another set of CMY color values that could be used would be all of the possible combinations of the allowable color values for the different color channels.

In some cases it is desirable to use other formulas to compute the total cost from the set of individual cost values. For example, Eq. (11) can be modified to apply a power function to each of the individual cost function terms:

$$cost_{total} = \left[\sum_{CMY}(w_{CMY}cost_{CMY})^p\right]^{1/p}, \quad (12)$$

where p is a positive constant. Typical values of p would be in the range of 1 to 10. Larger values of p have the effect of weighting larger individual cost values more heavily.

In general, since the number of possible arrangements of the dither values within the dither matrices is so large, it is not practical to calculate the cost for all of the variations to find the one that gives the smallest total cost value. There are a variety of optimization techniques that can be used to minimize the cost function In a preferred embodiment of the present invention, an optimization technique known as stochastic annealing is used to minimize the total cost. For more details regarding this optimization technique, as well as a discussion of some alternative techniques and visual cost functions, the reader is referred to the aforementioned U.S. Pat. No. 5,822,451.

The method for forming the inverted matrices of dither values will depend somewhat on the particular halftoning method that is being used. For example, in the method of FIG. 6, the optimized dither matrices will generally contain values between zero and some maximum value, e.g., 255. In this case, an inverted dither matrix can be formed by subtracting the value of each element of the optimized dither matrix from a predetermined maximum value. For example, consider the case where an optimized cyan dither matrix 54A contains values in the range 0–255. An inverted cyan dither matrix 59B can be determined using the following equation:

$$d_c(x_d,y_d)=255-d_C(x_d,y_d). \quad (13)$$

One of the advantages of using an inverted dither matrix for pairs of low- and high-density color channels is that it minimizes the likelihood that low- and high-density dots are placed on top of each other. The pixel locations that have the lowest dither values in the optimized dither matrix will be the first ones to be turned on in the resulting halftone pattern. These same pixel locations will have the highest dither values in the inverted dither matrix, and will therefore be the last ones to be turned on. Consider the example where both the light cyan input image and the dark cyan input image are indicating that a 50% coverage should be produced. In this case, the inverted matrix would have the effect of placing light cyan dots in all of the locations where dark cyan dots are not placed. Therefore, this will minimize the amount of dot overlap, and therefore will minimize the amount of white paper that shows for a given overall level of cyan density.

Figure 7:
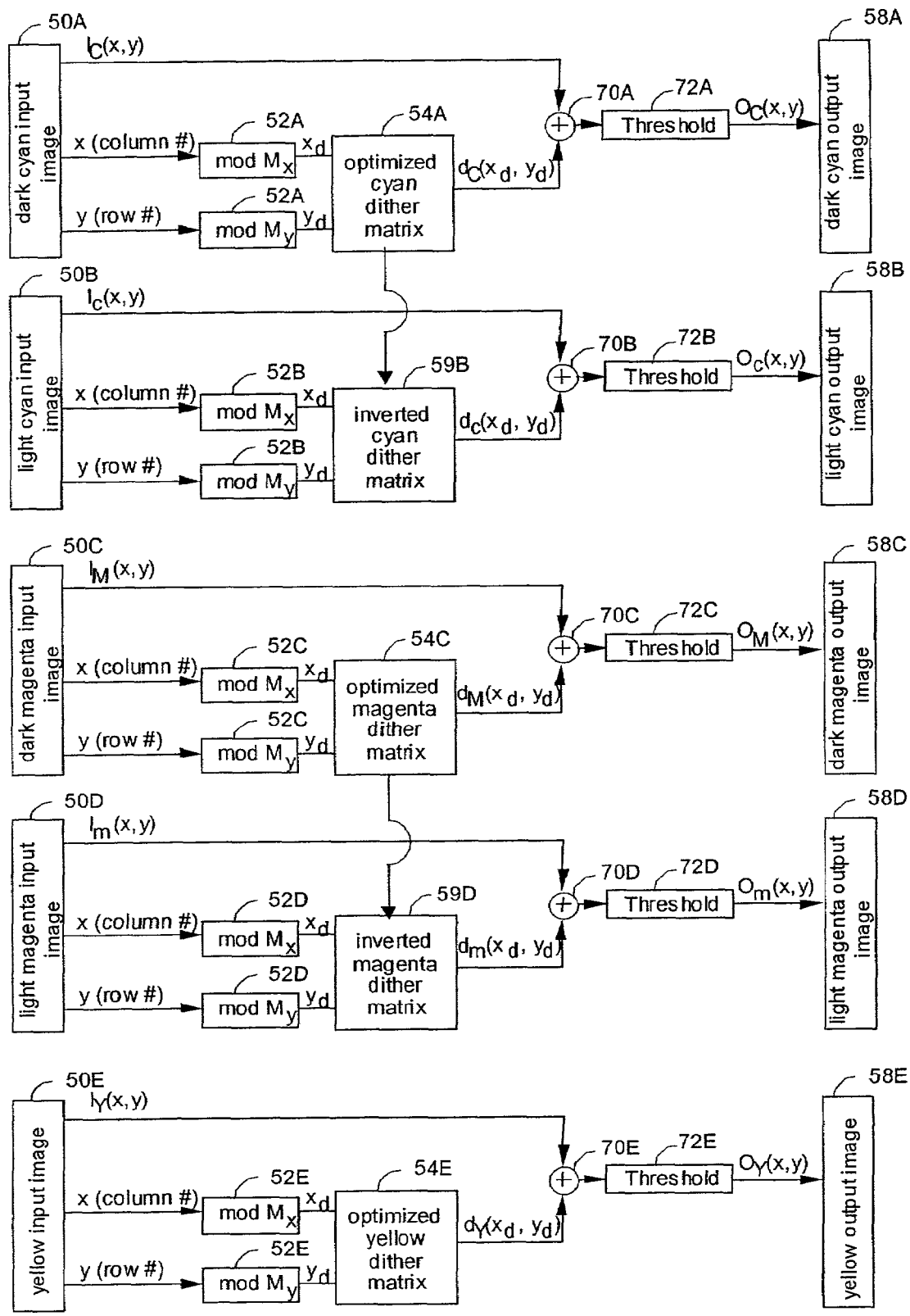
FIG. 7 is a schematic block diagram showing an alternative method for halftoning an image according to the present invention.

As mentioned before, the color dither halftoning method shown in FIG. 6 uses the same basic method that was shown in FIG. 1 for each channel of the color image. Other variations on this basic technique were shown in FIGS. 2-4, and they could simply be substituted into FIG. 6. For example, a second variation of the present invention is shown in FIG. 7 which uses a dither halftoning method analogous to that shown in FIG. 2. In this case the dither values $d_C(x_d,y_d)$, $d_c(x_d,y_d)$, $d_M(x_d,y_d)$, $d_m(x_d,y_d)$, and $d_Y(x_d,y_d)$ are combined with the input pixel values $I_C(x,y)$, $I_c(x,y)$, $I_M(x,y)$, $I_m(x,y)$, and $I_Y(x,y)$ using adders 70A–E. Threshold operators 72A–E are then used to threshold the combined values to determine the output pixel values $O_C(x,y)$, $O_c(x,y)$, $O_M(x,y)$, $O_m(x,y)$, and $O_Y(x,y)$. It can be seen that this method utilizes an identical set of optimized dither matrices and inverted matrices, although the mechanism for using the dither matrices is slightly different. Therefore, the same dither matrix inversion process that was described in Eq. (13) can also be used to produce the desired result in this case.

Figure 3:
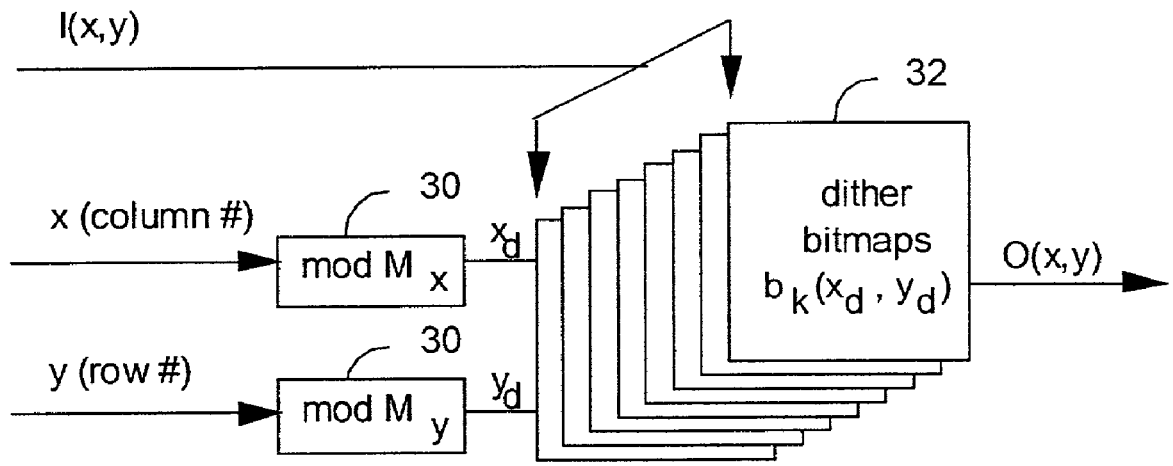

The dither halftoning method shown in FIG. 3 uses a set of dither bitmaps 32 rather than a dither matrix. Frequently, these dither bitmaps are simply determined by thresholding a dither matrix at each input level to find the corresponding dither pattern for that input level. If this dither halftoning technique were substituted into FIG. 6, inverted dither bitmaps can be determined by first determining an inverted dither matrix, and then thresholding the inverted dither matrix to determine inverted dither bitmaps. Alternatively, each of the dither bitmaps in the set of dither bitmaps could be inverted directly by swapping the polarity of each element of the dither bitmaps. That is, all of the "on" pixels can be turned "off," and all of the "off" pixels can be turned "on." Typically the "on" and "off" pixels are simply indicated by ones and zeros in the stored dither bitmaps. In this case, the inversion process can be represented mathematically in a manner analogous to Eq. (12):

$$b_{c,k}(x_d,y_d)=1-b_{C,k}(x_d,y_d), \quad (14)$$

where $b_{c,k}(x_d,y_d)$ is the dither bitmap for the $k^{th}$ pixel value for the light cyan color channel, and $b_{C,k}(x_d,y_d)$ is the dither bitmap for the $k^{th}$ pixel value for the dark cyan color channel. The light magenta dither bitmaps would be computed in an analogous fashion.

Figure 4:
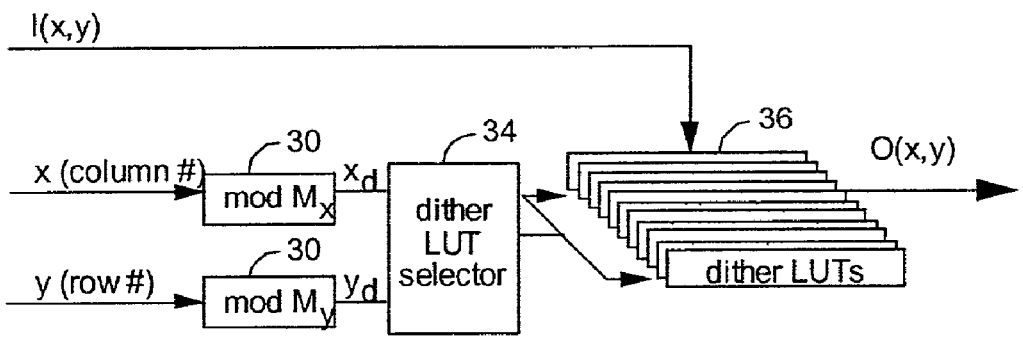
Figure 5:
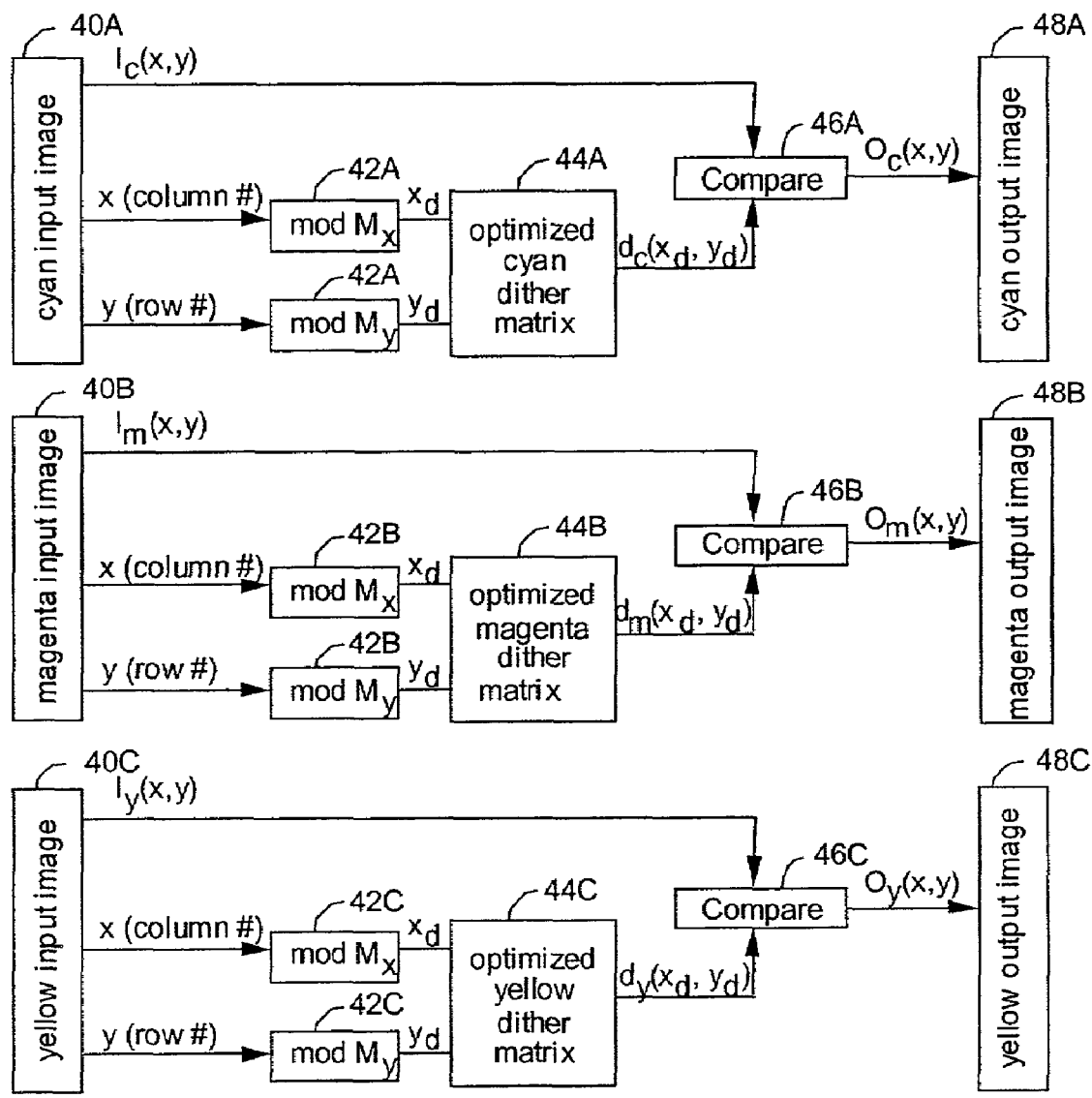
FIG. 5 is a schematic block diagram showing a prior art ordered dither technique including jointly optimized dither matrices.

The dither halftoning implementation shown in FIG. 4 uses a set of dither LUTs rather than dither matrices. These LUTs are selected by the pixel position, and are addressed using the input value. Frequently, these dither LUTs are simply determined from a dither matrix by determining the output value produced at each pixel position as a function of input level. (Since there are usually multiple elements in the dither matrix that have the same dither value, only one dither LUT needs to be created for each unique dither value.) If this dither halftoning technique were substituted into FIG. 6, inverted dither LUTs can be determined by first determining an inverted dither matrix, and then forming a corresponding set of dither LUTs. Alternatively, inverted dither LUTs can also be determined by flipping the optimized dither LUTs "end-to-end." Mathematically, this can be expressed by:

$$LUT_{c,xd,yd}(k)=LUT_{C,xd,yd}(255-k), \quad (15)$$

where k is the input value, $LUT_{c,xd,yd}(k)$ is the dither LUT for the $x_d,y_d$ dither address for the light cyan color channel, and $LUT_{C,xd,yd}(k)$ is the dither LUT for the $x_d,y_d$ dither address for the dark cyan color channel. The light magenta dither LUTs would be computed in an analogous fashion.

The optimization methods discussed above assume that the output device that is used to produce images with the optimized halftone patterns will produce ideal images with perfectly registered non-overlapping dots. For many devices, this assumption may be sufficiently close to reality that the resulting halftone patterns are near-optimum. In other devices, the failure to accurately model the characteristics of the output image can result in sub-optimal performance since the computed cost value associated with the visibility of the halftone patterns may be inaccurate. To correct this deficiency, the above methods can be modified to more accurately reflect the actual device characteristics during the step of calculating the visibility of the halftone patterns. The cost function can be modified in a number of ways to more accurately reflect the visibility of the halftone patterns.

Figure 8A:
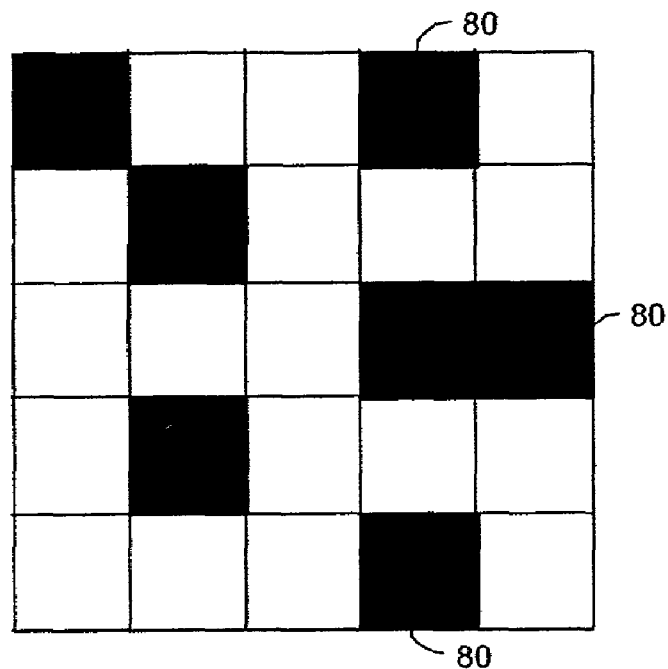
FIGS. 8A & B illustrates the difference between an ideal halftone pattern and a real halftone pattern.
Figure 8B:
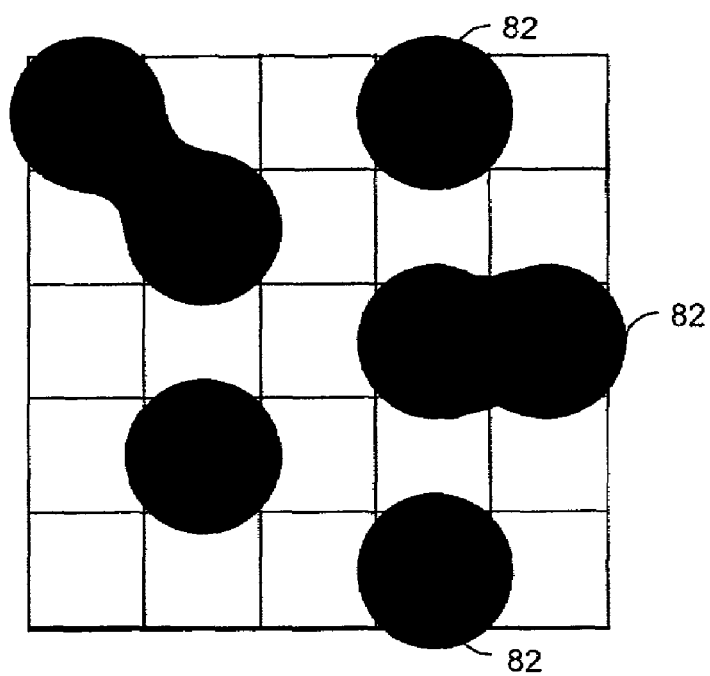

One example of a more accurate cost function is to use more sophisticated halftone dot models to account for the actual dot shapes/sizes and/or the interactions between nearby dots. In this case, the luminance distribution that is computed during the cost calculation would more accurately reflect the actual dot pattern created on the output device. For example, FIGS. 8A and B illustrates the difference between an ideal dot pattern (FIG. 8A) wherein the ideal dots 80 are non-overlapping; and a realistic dot pattern (FIG. 8B) more accurately reflecting the device characteristics for an output device wherein the realistic dots 82 overlap and interact. The most accurate device models will account for the dot interactions within a color channel, as well as between color channels.

Another example of a physical device characteristic that can influence the visibility of the halftone patterns is the dot placement accuracy of the output device. If the visibility of the halftone patterns is minimized with respect to perfectly registered patterns, the optimization process will tend to avoid putting different color dots on top of each other unless absolutely necessary. However, if one of the color channels is now misregistered with respect to the others, this will cause many of the dots to overlap. In fact, the number of dots that overlap may actually be higher than the number of dots that would have overlapped had the halftone patterns for each channel been determined independently. In some cases, this will actually result in halftone patterns that have a higher visibility. In this event, to determine halftone patterns that have the minimum visibility, it is necessary to incorporate a model that accounts for the dot placement statistics into the calculation of the cost function. There are a number of ways that this could be done. In one embodiment of this invention, an average visual cost value is calculated by combining a set of visual cost values corresponding to a number of variations of dot placement errors. The variations of dot placements are chosen to reflect the expected dot placement statistics for the specific output device. For example, if the dot placement within a color channel is very accurate, but the registration of the color channels with each other varies according to some known distribution, a set of perceived luminance distributions can be calculated using a set of registration errors selected from the known distribution. The average visual cost value can then be computed by averaging visual cost values associated with each of the set of perceived luminance distributions:

$$\overline{cost_{CMY}} = \frac{1}{N_r}\sum_{r=1}^{N_r} cost_{CMY,r}, \quad (15)$$

where $N_r$ is the number of registration variations in the set, and $cost_{CMY,r}$ is the cost associated with a particular registration variation.

The method of the present invention can also be extended to color output devices that have more than two output levels for some or all of the color channels. Such output devices are frequently referred to as multi-level output devices. Frequently, the number of output levels that the multi-level output devices can produce are less than the number of output levels that would be required to produce images that are continuous tone in appearance. For example, an ink jet printer may be adapted to produce one of 3 different dot sizes for each color channel for any given pixel. Similarly, a video display may be configured to produce one of 8 different red and green intensity levels, and one of 4 different blue intensity levels at any given pixel location. Algorithms that are designed to process continuous tone images for display on such devices in such a way that the average intensity level is preserved over a local region of the image are generally referred to as multi-level halftoning methods, or sometimes multi-toning methods.

Figure 9:
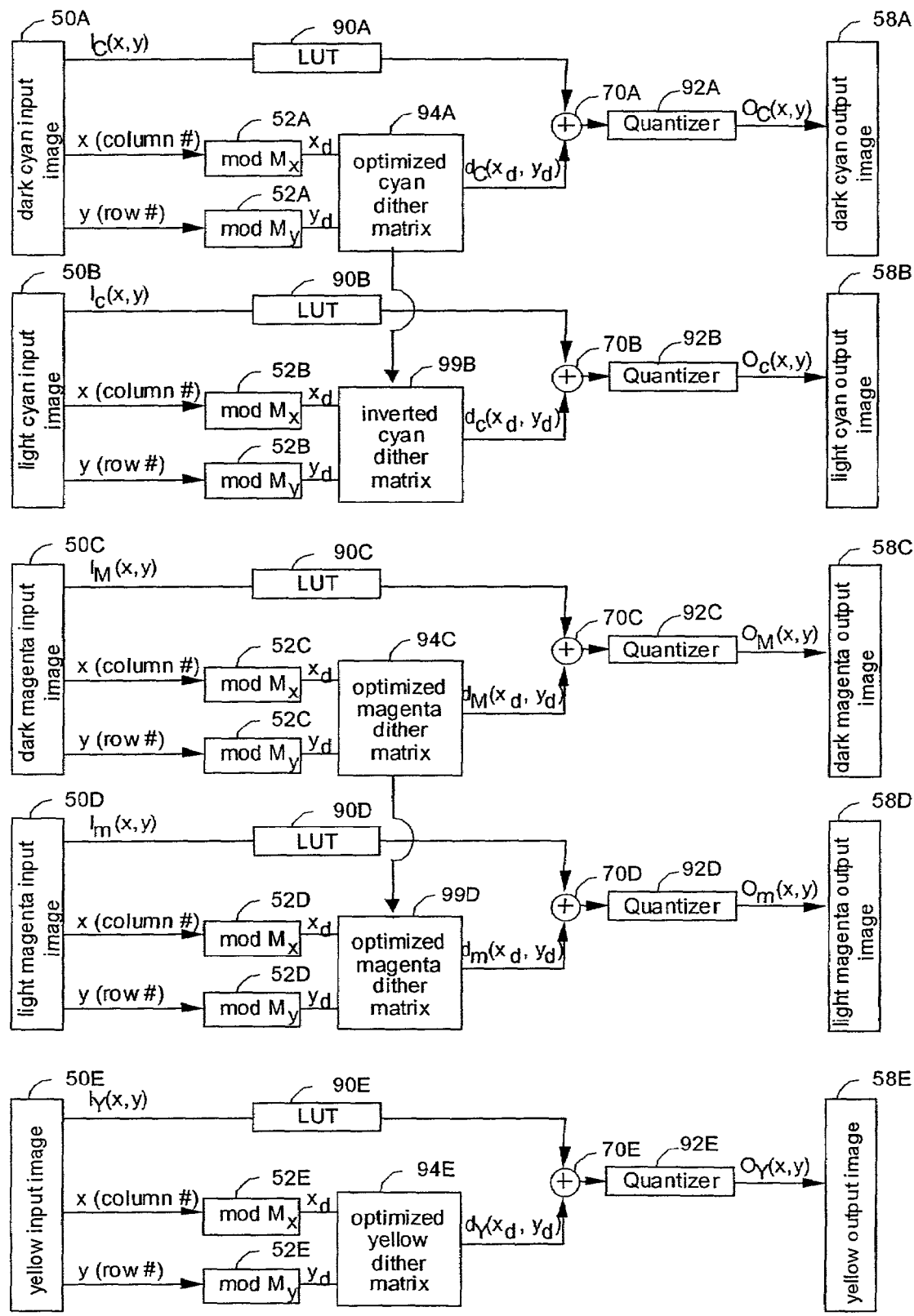
FIG. 9 is a schematic block diagram illustrating a multi-level halftoning method according to the present invention.

One common type of multi-level halftoning method is multi-level dither (see U.S. Pat. No. 5,586,203 cited above, which is incorporated herein by reference). The multi-level dither method for monochrome images produces halftoning patterns having minimum visibility to a human observer. This approach can be extended to multi-level color output devices in a manner analogous to that described above for binary color output devices. FIG. 9 illustrates one preferred embodiment of a multi-level halftoning method according to the present invention. It can be seen that the dither halftoning method is very similar to that shown in FIG. 7 except that the threshold operators 72A–E have been replaced by quantizers 92A–E, the jointly optimized dither matrices 54A, 54C and 54E have been replaced by jointly optimized multi-toning dither matrices 94A, 94C and 94E, and the inverted dither matrices 59B and 59D have been replaced by inverted multi-toning dither matrices 99B and 99D. The quantizers map modified input values within specified quantization intervals to corresponding output values. In the preferred embodiment, the quantizers are implemented as quantization look-up tables. Other forms of quantizers that could be used include division operators, and binary bit-shift operators In some cases it may also be desirable to include optional look-up tables (LUTs) 90A–E that are applied to the input pixel values, $I_C(x,y)$, $I_c(x,y)$, $I_M(x,y)$, $I_m(x,y)$, and $I_Y(x,y)$. These LUTs can be used to shape the tonescale of the printing process, and additionally to scale the magnitude of the input values so that they are compatible with the magnitude of the values stored in the optimized multi-toning dither matrices. In the preferred embodiment of this invention, the magnitude of the input pixel values and the dither matrix values are scaled so that the range of dither matrix values is equal to the size of the quantization intervals. This will ensure that the modulation associated with the resulting multi-level halftone patterns has the minimum possible amplitude.

Depending on the number of output levels and the scaling of the input values and the dither values, the dither matrices 94A, 94C, 94E, 99B and 99D can be identical to the jointly optimized dither matrices 54A, 54C, 54E, 59B and 59D shown in FIG. 7, or can simply be a scaled version of those matrices. Alternately, jointly optimized multi-toning dither matrices can be computed particularly for the multi-level configuration. In this case, the methods described above for computing jointly optimized dither matrices can be directly applied to this case, except that the luminance distributions are computed from the multi-level halftone patterns instead of binary halftone patterns.

As in the case of the binary output device, the optimized dither patterns can be applied to the image using a variety of methods. For example, U.S. Pat. No. 5,822,451, cited above, describes a method using dither LUTs analogous to that shown in FIG. 4. As with the binary halftoning case discussed earlier, the present invention can easily be generalized to use this multi-level dither halftoning technique by determining inverted dither LUTs from an appropriate set of jointly optimized dither LUTs.

The invention has been described with reference to a preferred embodiment. However, it will be appreciated that variations and modifications can be effected by a person of ordinary skill in the art without departing from the scope of the invention.

| PARTS LIST | |
|---|---|
| 10 | modulo operators |
| 12 | dither matrix |
| 14 | comparator |
| 24 | adder |
| 26 | threshold operator |
| 30 | modulo operators |
| 32 | dither bitmaps |
| 34 | dither LUT selector |
| 26 | dither LUTs |
| 40A-C | input images |
| 42A-C | modulo operators |
| 44A-C | dither matrices |
| 46A-C | comparators |
| 48A-C | output images |
| 50A-E | input images |
| 52A-E | modulo operators |
| 54A | optimized cyan dither matrix |
| 54C | optimized magenta dither matrix |
| 54E | optimized yellow dither matrix |

-continued

PARTS LIST

| | |
|---|---|
| 56A-E | comparators |
| 58A-E | output images |
| 59B | inverted cyan dither matrix |
| 59E | inverted magenta dither matrix |
| 70A-E | adders |
| 72A-E | threshold operators |
| 80 | ideal dots |
| 82 | real dots |
| 90A-E | look up tables |
| 92A-E | quantizers |
| 94A | optimized cyan dither matrix |
| 94C | optimized magenta dither matrix |
| 94E | optimized yellow dither matrix |
| 99B | inverted cyan dither matrix |
| 99E | inverted magenta dither matrix |

What is claimed is:

1. A method for halftoning a multi-channel digital color image having an x,y array of color pixel values, wherein at least two color channels are similar having substantially the same color but with low- and high-densities, comprising the steps of:
   a) providing a matrix of dither values for each group of similar color channels wherein two or more of the matrices of dither values are designed jointly to minimize a visual cost function;
   b) for at least one group of similar color channels, forming an inverted matrix of dither values by subtracting the value of each element of the matrix of dither values for that group from a predetermined maximum value, associating the inverted matrix of dither values with one of the low- or high-density color channels, and associating the matrix of dither values for that group with the other low- or high-density color channel of that group;
   c) for each color channel of the multi-channel digital color image modularly addressing the matrix of dither values associated with that color channel using the location of a pixel in the digital color image to obtain ad addressed dither value;
   d) using the addressed dither value for each color channel, together with the pixel value for the corresponding color channel, to determine an output halftone image value for each color channel; and
   e) repeating steps c) and d) for each pixel in the multi-channel digital color image.

2. The method of claim 1 wherein step d) includes the step of comparing the addressed dither value for each color channel with the pixel value for the corresponding color channel to determine the output halftone image value for each color channel.

3. The method of claim 1 wherein step d) includes the step of adding the addressed dither value for each color channel to the pixel value for the corresponding color channel and comparing the sum to a threshold value to determine the output halftone image value for each color channel.

4. The method of claim 1 wherein step d) includes the step of using the addressed dither value to select a dither look-up table from a set of dither look-up tables, and using the pixel value of the corresponding color channel to address the selected dither look-up table to determine an output halftone image value for each color channel.

5. The method of claim 1 wherein at least one of the color channels is printed using more than two output levels.

6. The method of claim 5 wherein step d) includes the step of adding the addressed dither value for each color channel to the pixel value for the corresponding color channel and quantizing the sum to determine the output halftone image value for each color channel.

7. The method of claim 6 wherein the sum is quantized using a division operator.

8. The method of claim 6 wherein the sum is quantized by addressing a quantization look-up table with the sum.

9. The method of claim 5 wherein step d) includes the step of using the addressed dither value to select a dither look-up table from a set of dither look-up tables, and using the pixel value of the corresponding color channel to address the selected dither look-up table to determine the output halftone image value for each color channel.

10. The method of claim 1 wherein one group of similar color channels is comprised of a low-density cyan color channel and a high-density cyan color channel.

11. The method of claim 1 wherein one group of similar color channels is comprised of a low-density magenta color channel and a high-density magenta color channel.

12. The method of claim 1 wherein one group of similar color channels is comprised of a low-density yellow color channel and a high-density yellow color channel.

13. The method of claim 1 wherein one group of similar color channels is comprised of a low-density neutral color channel and a high-density neutral color channel.

14. A computer program product comprising computer readable storage medium having a computer program stored thereon that performs the method of claim 1.

15. A method for halftoning a multi-channel digital color image having an x,y array of color pixel values, wherein at least two color channels are similar having substantially the same color but with low- and high-densities, said method comprising:
   providing a set of dither matrices including:
     a) a matrix of dither values for each group of similar color channels wherein two or more of the matrices of dither values are designed jointly to minimize a visual cost function; and
     b) for at least one group of similar color channels, an inverted matrix of dither values formed by subtracting the value of each element of the matrix of dither values for that group from a predetermined maximum value, the inverted matrix of dither values being associated with one of the low- or high-density color channels, and the matrix of dither values for that group being associated with the other low- or high-density color channel.

16. A method for halftoning a multi-channel digital color image having an x,y array of color pixel values, wherein at least two of the color channels are similar having substantially the same color but with low- and high-densities, comprising the steps of:
   a) providing a set of dither bitmaps for each group of similar color channels wherein the dither bitmaps for at least two of the groups of similar color channels are designed jointly to minimize a visual cost function;
   b) for at least one group of similar color channels, forming an inverted set of dither bitmaps by subtracting the value of each element of the dither bitmaps for that group from a predetermined maximum value, associating the inverted set of dither bitmaps with one of the low- or high-density color channels, and associating the set of dither bitmaps for that group with the other low- or high-density color channel;

c) for each color channel of the multi-channel digital color image, selecting the dither bitmap from the set of dither bitmaps associated with that color channel corresponding to the pixel value for a pixel in the multi-channel digital color image;

d) for each color channel modularly addressing the selected dither bitmap with the location of the pixel to obtain an output halftone image value; and e) repeating steps c) and d) for each pixel in the multi-channel digital color image.

17. The method of claim 16 wherein at least one of the color channels is printed using more than two output levels.

18. The method of claim 16 wherein one group of similar color channels is comprised of a low-density cyan color channel and a high-density cyan color channel.

19. The method of claim 16 wherein one group of similar color channels is comprised of a low-density magenta color channel and a high-density magenta color channel.

20. The method of claim 16 wherein one group of similar color channels is comprised of a low-density yellow color channel and a high-density yellow color channel.

21. The method of claim 16 wherein one group of similar color channels is comprised of a low-density neutral color channel and a high-density neutral color channel.

22. A computer program product comprising computer readable storage medium having a computer program stored thereon that performs the method of claim 16.

23. A method for halftoning a multi-channel digital color image having an x,y array of color pixel values, wherein at least two color channels are similar having substantially the same color but with low- and high-densities, comprising:
providing a set of dither bitmaps including:
a) a set of dither bitmaps for each group of similar color channels wherein two or more of the sets of dither bitmaps are designed jointly to minimize a visual cost function; and
b) for at least one group of similar color channels, an inverted set of dither bitmaps formed by subtracting the value of each element of the dither bitmaps for that group from a predetermined maximum value, the inverted set of dither bitmaps being associated with one of the low- or high-density color channels, and the set of dither bitmaps for that group being associated with the other low- or high-density color channel.

24. A method for halftoning a multi-channel digital color image having an x,y array of color pixel values, wherein at least two of the color channels are similar having substantially the same color but with low- and high-densities, comprising the steps of:
a) providing a set of first bitmaps for each group of similar color channels;
b) for at least one group of similar color channels, forming an inverted set of second bitmaps by subtracting the value of each element of the first bitmaps for that group from a predetermined maximum value, associating the inverted set of second bitmaps with one of the low- or high-density color channels, and associating the set of first bitmaps for that group with the other low- or high-density color channel;
c) for each color channel of the multi-channel digital color image, selecting the bitmap from the set associated with that color channel corresponding to the pixel value for a pixel in the multi-channel digital color image;
d) for each color channel modularly addressing the selected bitmap with the location of the pixel to obtain an output halftone image value; and
e) repeating steps c) and d) for each pixel in the multi-channel digital color image.

25. A method for halftoning a multi-channel digital color image having an x,y array of color pixel values, wherein at least two color channels are similar having substantially the same color but with low- and high-densities, comprising:
providing a set of dither bitmaps including:
a) a set of dither bitmaps for each group of similar color channels; and
b) for at least one group of similar color channels, an inverted set of dither bitmaps formed by subtracting the value of each element of the dither bitmaps for that group from a predetermined maximum value, the inverted set of dither bitmaps being associated with one of the low- or high-density color channels, and the set of dither bitmaps for that group being associated with the other low- or high-density color channel.

26. A method for halftoning a multi-channel digital color image having an x,y array of color pixel values, wherein at least two color channels are similar having substantially the same color but with low- and high-densities, comprising:
providing a set of bitmaps including:
a) a set of first bitmaps for each group of similar color channels; and
b) for at least one group of similar color channels, an inverted set of second bitmaps formed by subtracting the value of each element of the first bitmaps for that group from a predetermined maximum value, the inverted set of second bitmaps being associated with one of the low- or high-density color channels, and the set of first bitmaps for that group being associated with the other low- or high-density color channel.

* * * * *